C. W. BENDERNAGEL.
Mixing and Grinding Machines.
No. 146,981.                          Patented Feb. 3, 1874.
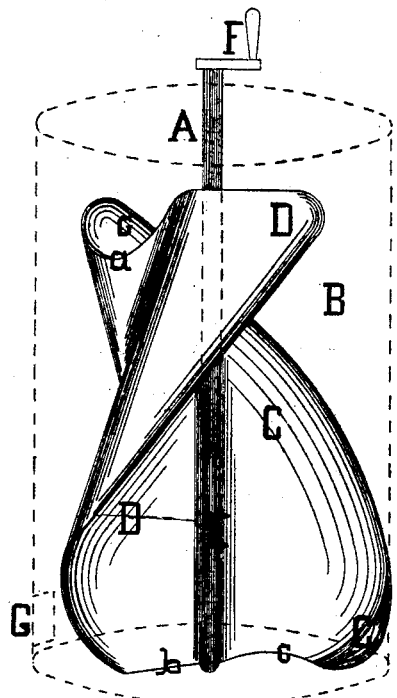
WITNESSES                            INVENTOR

UNITED STATES PATENT OFFICE.

CHARLES W. BENDERNAGEL, OF PHILADELPHIA, PENNSYLVANIA.

IMPROVEMENT IN MIXING AND GRINDING MACHINES.

Specification forming part of Letters Patent No. 146,981, dated February 3, 1874; application filed December 10, 1873.

*To all whom it may concern:*

Be it known that I, CHARLES W. BENDERNAGEL, of Philadelphia, in the county of Philadelphia and State of Pennsylvania, have invented a new and useful Machine for Mixing and Grinding Clays, Plaster, Paints, Colors, &c., of which the following is a specification:

The invention consists of two semi-spirals or screw-threads, placed oppositely on the same vertical shaft. One is a right-hand screw or spiral—the other a left-hand screw or spiral. The function of one is to carry up and over—that of the other to carry down and under. They can be of equal or unequal diameters. When of equal diameters, the bottom of the down-screw-carrying thread or spiral must be a sufficient distance from the bottom of the mixing-tub to permit the material to pass freely under.

The accompanying drawing fully illustrates the nature of my invention.

A is a vertical shaft, which turns in suitable bearings of the tub or mixer. B C D are spirals or screw-threads, at right angles or conveniently thereabout, on the hub E of the shaft A. The screw-thread C is what is denominated a "right-hand pitch," and when in motion it creates an up current. The screw-thread D is a left-hand pitch, and creates a down current. The ground clay, ink-color, paint, or other mixer, is put into the mixing-tub B, with the mixing fluid. When power is applied to the shaft A, through the medium of the handle F or other suitable device, the revolution of the screw C creates an up current of the clay or ink-mixer and the fluid, which it carries over its upper edge a, where it is caught by the screw D, and carried down and under its bottom edge b, to the bottom edge c of the screw C, and again carried up. The revolutions of the screws thoroughly mix and make homogeneous the material in the tub, which can be afterward drawn off through the trap G, (dotted lines.) When the screws are of equal diameters they revolve against or adjacent to the inner surface of the circular tub B, which spreads or mixes the plaster, clay, or color, as the case may be, the current being up and over one screw, down and under the other. When the screws are of unequal diameters, the material is allowed in its downward current to pass between the smaller diameter and the circular surface of the tub, where it is partially ground.

I claim as my invention—

In a mixing-machine constructed as described, the right and left hand screws C D, arranged as shown, so that the material to be acted upon will be forced up over one blade, and down under the other, as and for the purpose specified.

In testimony whereof I hereunto sign my name in presence of two subscribing witnesses.

CHARLES W. BENDERNAGEL.

Witnesses:
CHRISTIAN GEIGER,
FRANCIS D. PASTORIUS.